UNITED STATES PATENT OFFICE.

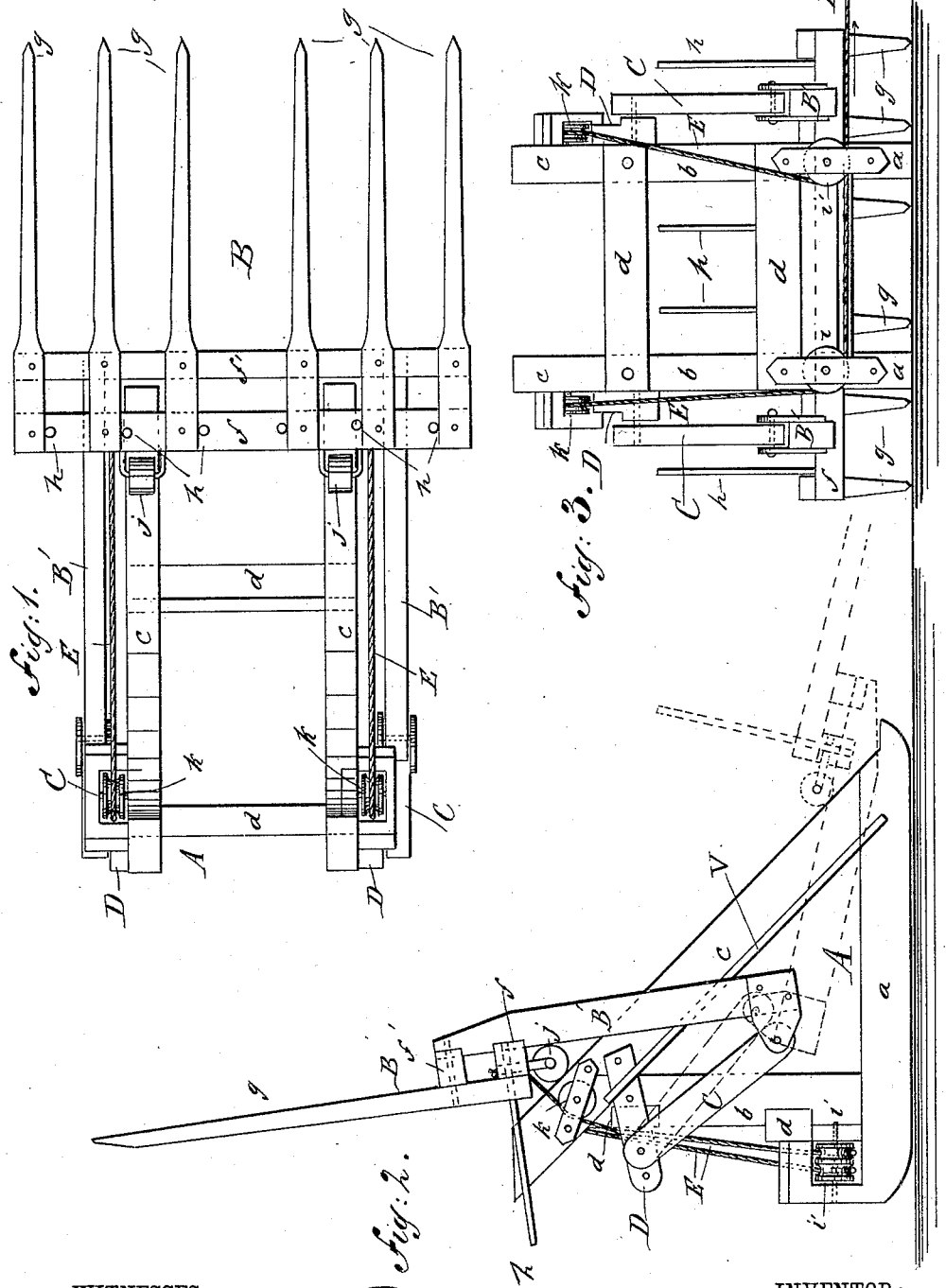

JESSE MORRIS, OF SIOUX RAPIDS, IOWA.

HAY-STACKER.

SPECIFICATION forming part of Letters Patent No. 397,512, dated February 12, 1889.

Application filed January 14, 1888. Serial No. 260,776. (No model.)

*To all whom it may concern:*

Be it known that I, JESSE MORRIS, of Sioux Rapids, in the county of Buena Vista and State of Iowa, have invented a new and Improved Hay-Stacker, of which the following is a full, clear, and exact description.

Reference is to be had to the accompanying drawings, forming a part of this specification, in which similar letters of reference indicate corresponding parts in all the figures.

Figure 1 is a plan view of my new and improved hay-stacker. Fig. 2 is a side elevation of the same, the elevating-fork being shown elevated in full lines and lowered in dotted lines; and Fig. 3 is an end view of the stacker.

The invention will first be described in connection with the drawings, and then pointed out in the claim.

A represents a main frame composed of the sills $a\ a$, posts $b\ b$, the inclined beams $c\ c$, and the cross-bars $d\ d$. The inclined beams $c\ c$ constitute the track for raising the hay-fork B, by which the hay is elevated from the ground to the stack. The fork B is composed of the bars $f\ f'$, tines $g\ g$, secured to said bars, the rods $h\ h$, held by the bar $f$ at right angles to the tines $g$, and the heavy side arms, B' B'. The rear ends of these arms B' are pivoted to the ends of the connecting-links C, which are pivoted at their opposite ends to the fixed projections D D, secured to the main frame A, thus forming a double pivotal connection of the fork B with the main frame, so that the former may be lowered to the ground, as shown in dotted lines in Fig. 2, or elevated to the position shown in full lines in said figure.

The fork B is operated by the ropes E E, connected to the bar $f$, and passed thence over the pulleys $k$ at the top of the inclined beams $c\ c$, and thence under the pulleys $i\ i'$, located near the bottom of the main frame.

At the rear of the bar $f$ are placed the anti-friction rollers $j\ j$, which run upon the upper edge of the inclined beams $c\ c$, and thus prevent undue friction in the movement of the fork B upon the main frame A.

In use the hay is deposited upon the tines $g$, and the ropes E are then drawn upon by a horse hitched thereto, which will elevate the fork B to the position shown in full lines in Fig. 2, elevating the hay with it and dumping it at the back of the machine. The rods $h$ prevent the hay from falling upon the main frame of the machine.

V represents a rod placed along the lower edge of the bar $c$. It serves in a degree to brace and stiffen the bar $c$; but it may be omitted, if desired.

Having thus fully described my invention, I claim as new and desire to secure by Letters Patent—

In a hay-stacker, the combination, with the main frame composed of the sills $a\ a$, vertical posts $b\ b$, inclined beams $c\ c$, and the cross-bars $d\ d$, the fixed projections D D, projecting rearwardly from the upper edge of the beams $c\ c$, and the connecting-links C, pivoted at their outer ends to the projections D, of the fork B, said fork consisting of the side arms, B', the rear ends thereof pivoted to the inner ends of the links C, the bars $f\ f'$, tines $g\ g$, the rods $h\ h$, friction-rollers $j\ j$, connected to the rear of the bar $f$, adapted to travel on the beams $c\ c$, and means for raising and lowering the fork B, substantially as shown and described.

JESSE MORRIS.

Witnesses:
ISOM MORRIS,
JOS. W. DEUPREE.